(12) United States Patent
Ottesen et al.

(10) Patent No.: US 6,415,238 B1
(45) Date of Patent: Jul. 2, 2002

(54) ADAPTIVE COMPENSATION FOR ARM ELECTRONICS AMPLIFICATION CIRCUITRY OF A DISK DRIVE SYSTEM

(75) Inventors: Hal Hjalmar Ottesen; Gordon James Smith, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/354,503

(22) Filed: Jul. 16, 1999

(51) Int. Cl.[7] .............................................. G06F 19/00
(52) U.S. Cl. ............................ 702/109; 702/66; 360/67
(58) Field of Search .............................. 702/57, 64–66, 702/69, 75–77, 85, 89, 106–109, 117, 124, 126, 183, 189, 190, 197; 360/46, 65, 66, 67; 324/76.11, 76.12, 76.28

(56) References Cited

U.S. PATENT DOCUMENTS 5,204,789 A * 4/1993 Jove et al. .................. 360/323
5,257,252 A * 10/1993 Barnes et al. ............ 360/77.06
5,633,765 A * 5/1997 Lin et al. ...................... 360/46

* cited by examiner

Primary Examiner—Marc S. Hoff
Assistant Examiner—Manuel L. Barbee
(74) Attorney, Agent, or Firm—Mark A. Hollingsworth

(57) ABSTRACT

An apparatus and method for estimating one or more pole frequencies of an amplifier circuit, such as a readback signal amplifier circuit implemented in an arm electronics module of a data storage system, are disclosed. A bias signal that biases the read transducer is modulated at first and second modulation frequencies while a readback signal is obtained from a data storage medium using the read transducer. The readback signal is communicated to the amplifier, and an output signal of the amplifier circuit is measured at the respective first and second modulation frequencies. The amplifier pole frequency is determined by computing a square impedance measurement ratio using square magnitudes of the bias signal and the amplifier output signal respectively measured at the first and second modulation frequencies.

45 Claims, 5 Drawing Sheets

ADAPTIVE COMPENSATION FOR ARM ELECTRONICS AMPLIFICATION CIRCUITRY OF A DISK DRIVE SYSTEM

FIELD OF THE INVENTION

The present invention relates generally to data storage systems and, more particularly, to a system and method for estimating and altering the frequency of a pole of a readback signal amplifier circuit.

BACKGROUND OF THE INVENTION

A typical data storage system includes a magnetic medium for storing data in magnetic form and a transducer used to write and read magnetic data respectively to and from the medium. A typical disk storage device, for example, includes one or more data storage disks coaxially mounted on a hub of a spindle motor. The spindle motor rotates the disks at speeds typically on the order of several thousand revolutions-per-minute (RPM).

Digital information is typically stored in the form of magnetic transitions on a series of concentric, spaced tracks formatted on the surface of the magnetizable rigid data storage disks. The tracks are generally divided into a number of sectors, with each sector comprising a number of information fields, including fields for storing data, and sector identification and synchronization information, for example.

An actuator assembly typically includes a plurality of outwardly extending arms with one or more transducers and slider bodies being mounted on flexible suspensions. The slider body lifts the transducer head off the surface of the disk as the rate of spindle motor rotation increases, and causes the head to hover above the disk on an air bearing produced by high speed disk rotation. The distance between the head and the disk surface, which is typically on the order of 40–100 nanometers (nm), is commonly referred to as head-to-disk clearance or spacing.

A read element of a transducer reads digital information provided on the disk surface and, in response, produces a readback signal which is communicated to amplification circuitry. The amplification circuitry, which is often provided in an arm electronics (AE) module, typically exhibits a highpass filtering behavior due to the presence of a low pole in the AE amplifier transfer function. The presence of the low pole causes both an attenuation and a phase shift in the readback signals processed by the AE module out beyond the low pole frequency. It is known that any appreciable degree of phase distortion in readback signals processed by an AE module can result in read channel errors of varying severity.

In disk drive systems that employ magnetoresistive (MR) transducers, it is well known that the highpass pole frequency of an individual AE amplifier can vary by up to ±50% relative to other AE modules of the disk drive system. In addition, the AE module filter characteristics typically change as a function of temperature. Depending on the particular AE module design, and assuming that an MR transducer is employed, large variations in pole frequency often result from differences in the nominal resistances of the MR transducers that are employed in a given disk drive system.

Generally, a large variation in the AE amplifier pole frequency will occur for each individual MR head of a disk drive system. This variation in pole frequency is very detrimental to the dynamic equalization effort of the recording channel. Moreover, various techniques that attempt to compensate for pole frequency variations in an AE amplifier generally require an estimation of the pole frequency. Absent the ability to reliably estimate the pole frequency with a sufficient degree of accuracy, such compensation approaches are met with little success.

There is a need for an apparatus and method for accurately estimating the pole frequency of a readback signal amplifier circuit used in a data storage system. There exists a further need for a system and method for compensating for the AE pole associated with each head of a data storage system, and for providing the ability to alter the pole frequency depending on the particular function to be performed. The present invention fulfills these and other needs.

SUMMARY OF THE INVENTION

The present invention is directed to an apparatus and method for estimating a pole frequency of an amplifier circuit, such as a readback signal amplifier circuit implemented in an arm electronics module of a data storage system. The amplifier circuit exhibits a highpass filter frequency behavior due to the presence of a low pole, the frequency of which may be determined in accordance with the principles of the present invention.

Estimating the pole frequency of a readback signal amplifier circuit that exhibits a highpass filter frequency behavior involves modulating a bias signal that biases the read transducer. The bias signal, which may be a current signal or a voltage signal, is modulated at a first modulation frequency and at a second modulation frequency while a readback signal is obtained from a data storage medium using the read transducer, preferably from an erased location of the medium. The readback signal is communicated to the amplifier, and an output signal of the amplifier circuit, such as a output voltage signal, is measured at the respective first and second modulation frequencies. The pole is determined using the output signal measurements.

Modulating the bias signal involves modulating the bias signal using a first perturbing signal at the first modulation frequency and modulating the bias signal using a second perturbing signal at the second modulation frequency. The first modulation frequency is preferably a frequency less than the frequency of the pole, and the second modulation frequency is a frequency greater than the frequency of the pole. The first and second perturbing signals are preferably square waves. The second modulation frequency is preferably an odd harmonic of the first modulation frequency. For example, the second modulation frequency may be a third harmonic of the first modulation frequency.

Measuring the output signal involves digitizing the output signal and performing a discrete Fourier transform on the digitized output signal at the first and second frequencies. In one embodiment the discrete Fourier transform operations are performed using Goertzel's algorithm. Determining the pole frequency of the amplifier circuit involves computing a square impedance measurement ratio using the square magnitudes of the bias signal and the amplifier output signal respectively measured at the first and second modulation frequencies.

In accordance with one embodiment, the numerator of the square impedance measurement ratio is computed using the magnitude of the DFT component of an output voltage signal at a second modulation frequency, $f_2$, multiplied by the magnitude of the DFT component of a modulating bias current at a first modulation frequency, $f_1$. The denominator of the square impedance measurement ratio is computed using the magnitude of the DFT component of an output voltage signal at the first modulation frequency, $f_1$, multiplied by the magnitude of the DFT component of a modulating bias current at the second modulation frequency, $f_2$. The pole frequency is determined using the square impedance measurement ratio and values of the first and second modulation frequencies, $f_1$ and $f_2$.

The pole frequency of the readback signal amplifier may be altered subsequent to a determination of the pole frequency. The amplifier pole may be selectively altered according to selection of a particular mode of operation or function to be performed, such as a recording function or diagnostic function.

Altering the overall pole frequency involves digitally filtering a sampled amplifier output signal so as to alter the pole frequency to a preestablished frequency. Alteration of the overall pole frequency may be accomplished using a pole-zero cancellation technique. The pole frequency of the amplifier circuit may be estimated, altered, and stored for each of a plurality of read transducers when each is coupled to the amplifier circuit.

A circuit for estimating a frequency of a readback signal amplifier pole includes a modulator coupled to a read transducer, such as a read transducer comprising an MR element. The modulator produces a modulated bias signal at respective first and second modulation frequencies for purposes of biasing the read transducer during a pole frequency determination procedure. A converter is coupled to the amplifier and receives an output signal representative of the readback signal from the amplifier. The converter converts the amplifier output signal to a digitized output signal. A processor estimates the pole frequency of the readback signal amplifier using a measurement of the digitized output signal at the respective first and second modulation frequencies in accordance with the above described methodology. In one embodiment, the circuit is provided in a data storage system.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
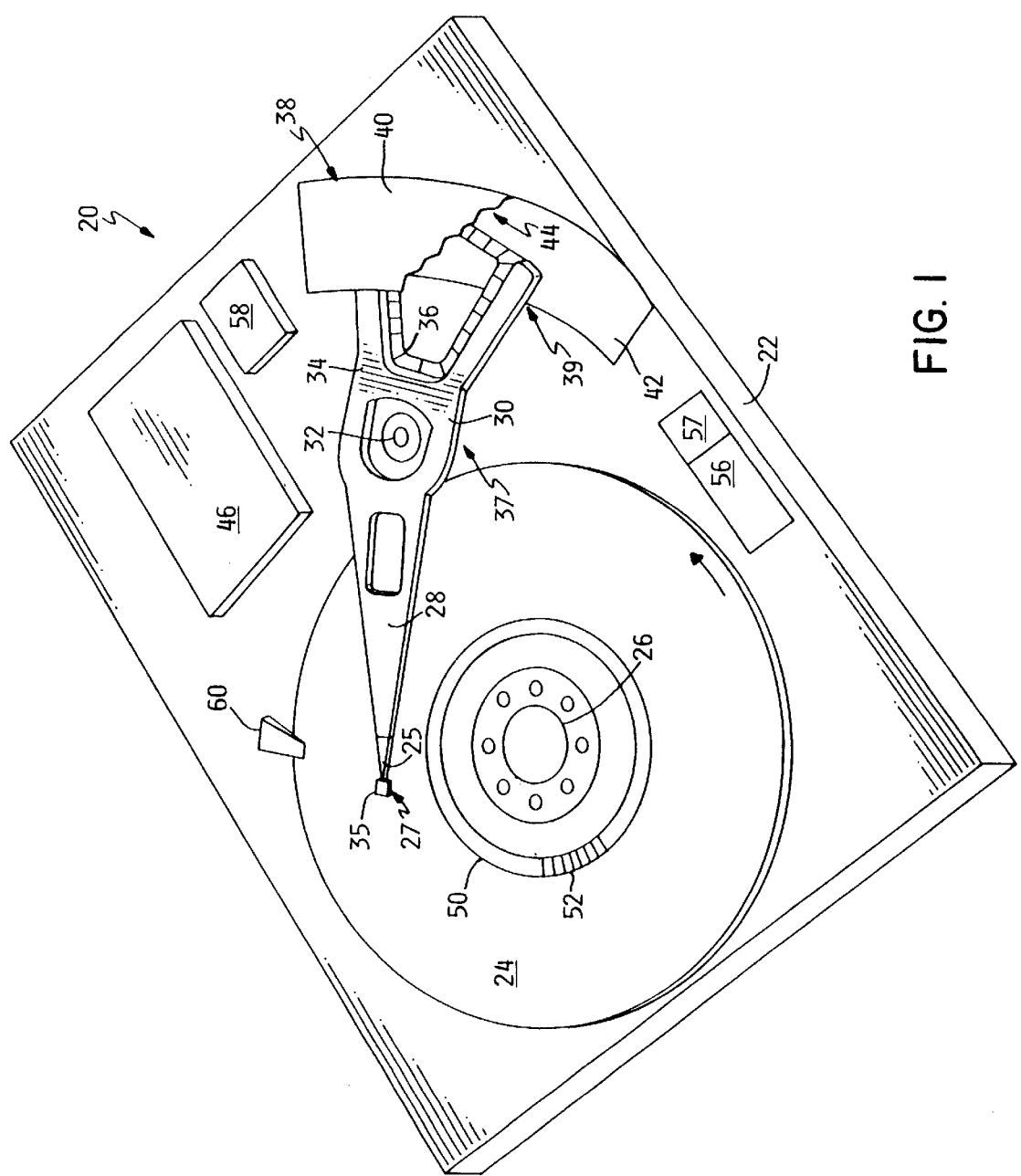
FIG. 1 is a top perspective view of a disk drive system with its upper housing cover removed.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Figure 2:
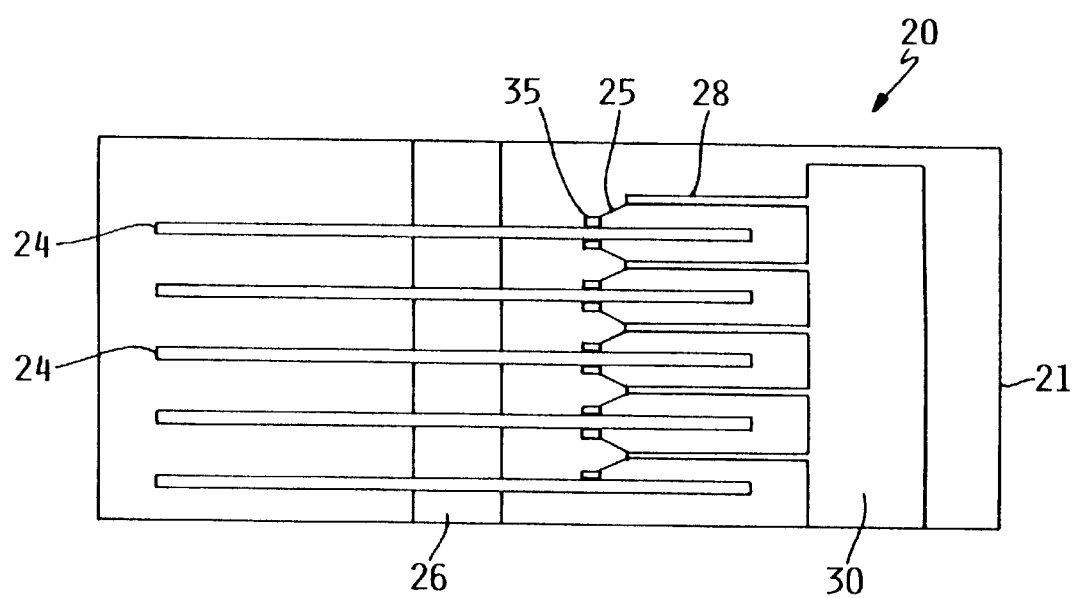
FIG. 2 is a side plan view of a disk drive system comprising a plurality of data storage disks.

Referring to the drawings, and more particularly to FIGS. 1 and 2, there is illustrated a data storage system 20 within which an AE amplifier pole frequency estimation methodology of the present invention may be implemented. The disk drive system 20, as is best shown in FIG. 2, typically includes one or more rigid data storage disks 24 which are stacked coaxially in a tandem spaced relationship, and rotate about a spindle motor 26 at a relatively high rate of rotation.

As is depicted in FIG. 1, each disk 24 is typically magnetically formatted to include a plurality of spaced concentric tracks 50. One or more of the disks 24 may alternatively be magnetically formatted to include a spiraled track configuration, or a combination of concentric and spiraled track configurations. Digital information is typically stored in the form of magnetic transitions along the tracks 50. The tracks 50 are generally divided into a number of sectors 52, with each sector 52 comprising a number of information fields, including fields for storing data, and sector identification and synchronization information, for example.

Writing data to a magnetic data storage disk 24 generally involves passing a current through the write element of the transducer assembly 27 to produce magnetic lines of flux which magnetize a specific location of the disk surface 24. Reading data from a specified disk location is typically accomplished by a read element of the transducer assembly 27 sensing the magnetic field or flux lines emanating from the magnetized locations of the disk surface 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator aims 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an air bearing produced by high speed rotation of the disk 24. The distance between the slider 35 and the disk surface 24, which is typically on the order of 40–100 nanometers (nm), is commonly referred to as head-to-disk clearance or spacing.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The data storage system 20 shown in FIG. 1 preferably employs a closed-loop servo control system for positioning the read/write transducers 27 to specified storage locations on the data storage disk 24. During normal data storage system operation, a servo transducer, generally mounted proximate the read/write transducers, or, alternatively, incorporated as the read element of the transducer assembly 27, is typically employed to read information for the purpose of following a specified track (i.e., track following) and locating (i.e., seeking) specified track and data sector locations on the disk surface 24.

In accordance with one servo technique, embedded servo pattern information is written to the disk 24 along segments extending in a direction generally outward from the center of the disk 24. The embedded servo patterns are thus formed between the data storing sectors of each track 50. It is noted that a servo sector typically contains a pattern of data, often termed a servo burst pattern, used to maintain optimum alignment of the read/write transducers 27 over the centerline of a track 50 when transferring data to and from specified data sectors on the track 50. The servo information may also include sector and track identification codes which are used to identify the location of the transducer assembly 27.

The servo processor 56, which cooperates with read channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56 and disk drive controller 58 are depicted as two separate devices in FIG. 1, it is understood that the functionality of the servo processor 56 and disk drive controller 58 may be embodied in a single multi-purpose processor, which typically results in a reduced component cost.

As was discussed previously, a readback signal obtained from data storage disk 24 is typically amplified by amplification circuitry prior to being communicated to the read channel electronics 57. Such amplification circuitry is often provided in an arm electronics module coupled between the transducer 27 and the read channel electronics 57.

The amplification circuitry of the AE module typically exhibits a highpass filter frequency behavior due, in large part, to the presence of a low pole in the AE module transfer function. The presence of the low pole causes both an attenuation and a phase shift in the readback signals processed by the AE module out beyond the low pole frequency. In many disk drive systems, such as those that employ a PRML-like read channel, any appreciable degree of phase distortion in readback signals processed by an AE module can cause read channel errors of varying severity.

Many operational and diagnostic techniques implemented in hard disk drive systems either assume or require a constant uniform AE module transfer function. Various known head flyheight measurement techniques assume that the frequency response of the readback channel is flat over the frequency range of interest. One such technique for determining head-to-disk clearance is referred to as a Harmonic Ratio Flyheight (HRF) clearance test. The low frequency AE pole, however, often influences the readback channel frequency response in the frequency range of interest, thereby rendering this assumption suspect or faulty. Large errors in flyheight measurements can occur if the frequency related alterations caused by the low frequency AE pole are not properly addressed.

Those skilled in the art, however, readily appreciate the difficulty of determining the location of the AE pole, particularly when MR elements are employed as read transducers. The past inability to accurately determine the frequency of the AE module pole significantly limits the ability to properly account or adjust for frequency related problems resulting therefrom. As will be discussed in greater detail hereinbelow, the inventors have developed techniques for estimating the frequency of an AE module pole and, in addition, techniques for altering the AE module pole.

Figure 3:
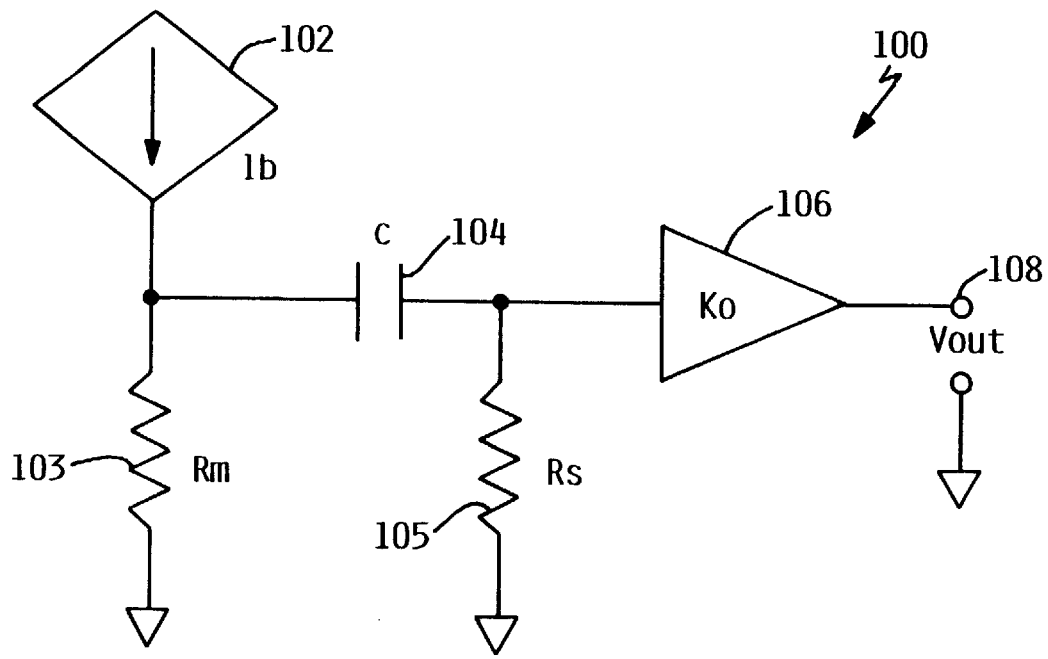
FIG. 3 is a schematic representative of an analog AE amplification system including an MR element, an MR bias source, a highpass filter, and an analog AE amplifier circuit.

Turning now to FIG. 3, there is illustrated a schematic which is representative of an analog AE amplification system 100. A typical AE module which is employed to amplify a readback signal obtained from a read transducer generally exhibits a frequency response that resembles a first order highpass filter. The analog AE amplification system 100 shown in FIG. 3 includes a constant current source 102 which provides a bias current to a resistive element 103, depicted as resistor $R_m$. In an embodiment which employs a magneto-resistive (MR) transducer, resistive element 103 represents MR head resistance. The highpass filter elements of analog AE amplification system 100 include capacitor 104, having a value C, and resistor 105, having a value of $R_s$. It is noted that capacitor 104 and resistor 105 are typically equivalence of on-chip devices of an AE amplifier located in an AE module.

In the following analysis, it is assumed that an MR element is used as a read transducer for obtaining a readback signal from a data storage medium, and that the readback signal is communicated to an AE module exhibiting a highpass filter frequency behavior. The equivalent highpass filter transfer function, G(s), associated with the AE module which accounts for MR head resistance, $R_m$, is given as:

$$G(s) = K_o * K_r * \frac{s}{(s+p)} \qquad [1]$$

where, $K_o$ represents the design specified fixed AE amplifier gain, the pole frequency is given by s=−p, and the term $K_r$ in Equation [1] above is given by:

$$K_r = \frac{R_s * R_m}{(R_s + R_m)} \quad [2]$$

The pole frequency, p, is known to vary as a function of the highly variable MR resistance term, $R_m$, as is evident in Equation [3] provided below:

$$p = \frac{2*\pi}{((R_s + R_m)*C)} \quad [3]$$

A large variation in pole frequency will thus occur for each individual MR head. This variation in pole frequency is very detrimental to the dynamic equalization effort of the recording channel, as was discussed above. In certain AE module designs, for example, AE module pole frequency variations on the order of ±50% are not uncommon.

Estimating the AE pole frequency, p, has heretofore not been possible with a high degree of reliability using conventional techniques. The process of determining the AE pole frequency, p, is made difficult due in large part to the MR element's involvement in the effective AE pole frequency. The inventors, however, have developed techniques to reliably and accurately estimate the AE pole frequency, p.

Figure 4:
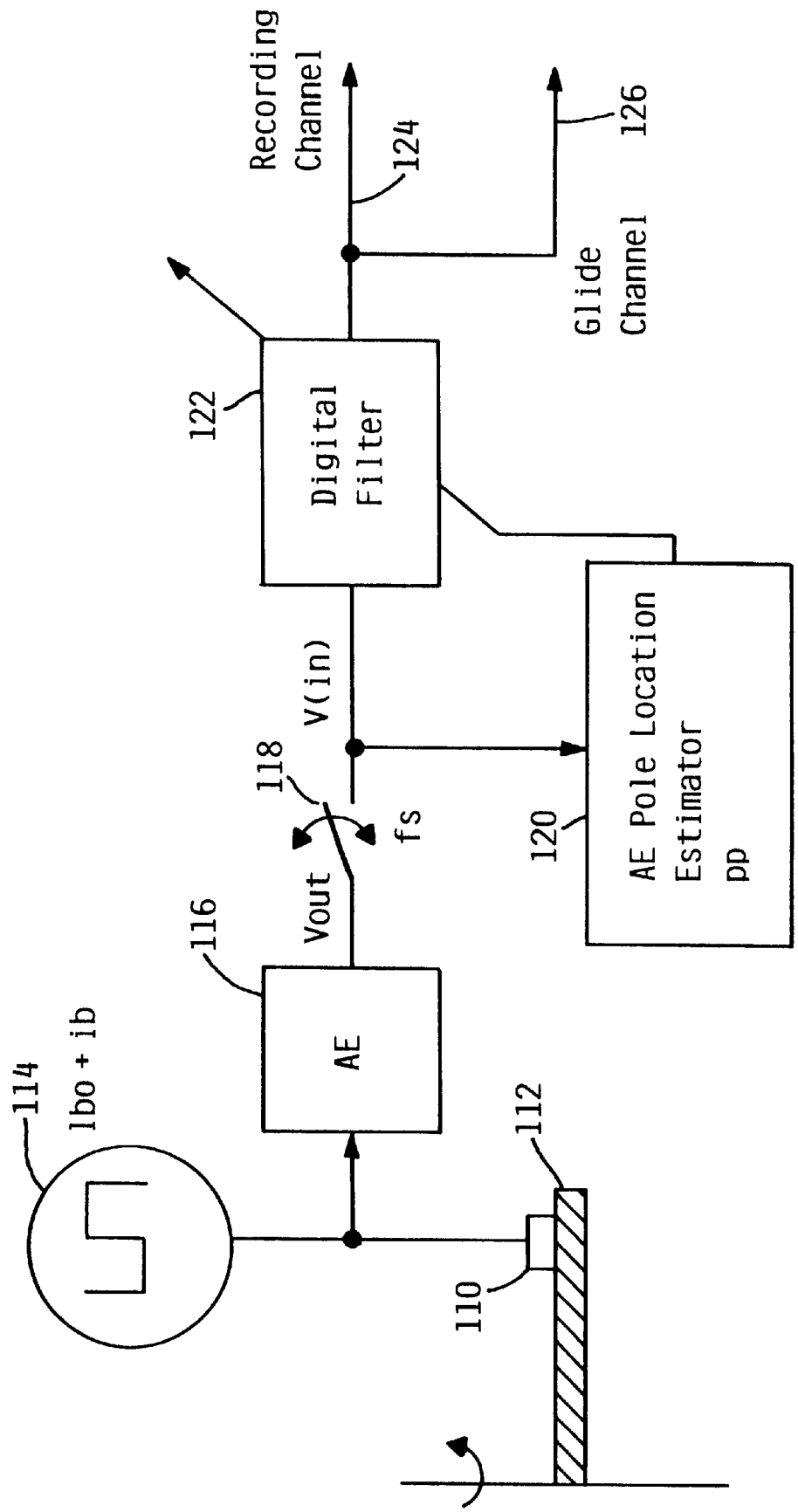
FIG. 4 is a block diagram of a circuit for estimating the pole frequency of an AE amplifier circuit in accordance with the present invention.

With reference to FIG. 4, there is illustrated a block diagram of a circuit for estimating the pole frequency of an AE amplifier. In FIG. 4, a read transducer 110 is shown situated over a portion of a data storage medium 112. Read transducer 110 represents any of a number of read transducer implementations, designs, and technologies, but is generally assumed herein to constitute a magnetoresistive read element.

In an embodiment in which data storage medium 112 represents a data storage disk, read transducer 110 flies over an erased track of data storage disk 112 during the pole frequency estimating process. A bias current source 114 produces a fixed bias current, $I_{b0}$, during normal read operations. Bias current source 114 may be integrated into the AE module which incorporates AE amplifier 116. It is significant to note that the AE pole estimation methodology of the present invention is independent of the constant bias current, $I_{b0}$.

During a pole frequency estimation procedure in accordance with the present invention, the bias current source signal, $I_{b0}$, is modulated by a small symmetric square wave, $I_b$. It is noted that bias current source 114 may alternatively represent a voltage source rather than a current source. In such a configuration, bias voltage source 114 produces a fixed bias voltage, $V_{b0}$, which is modulated by a small symmetric voltage signal, $V_b$.

A voltage signal, $V_{out}$, produced at the output of AE amplifier 116 is sampled and digitized by sampling switch 118 at a sampling rate of $f_s$. It is understood that the sampling rate, $f_s$, at least meets the Nyquist requirement, but is typically on the order of five to ten times greater than the maximum frequency component of the AE amplifier output voltage, $V_{out}$. The sample voltage, V(n), provided at the output of sampling switch 118 is used by the pole estimator 120 to precisely estimate the pole frequency associated with AE amplifier 116.

Figure 5:
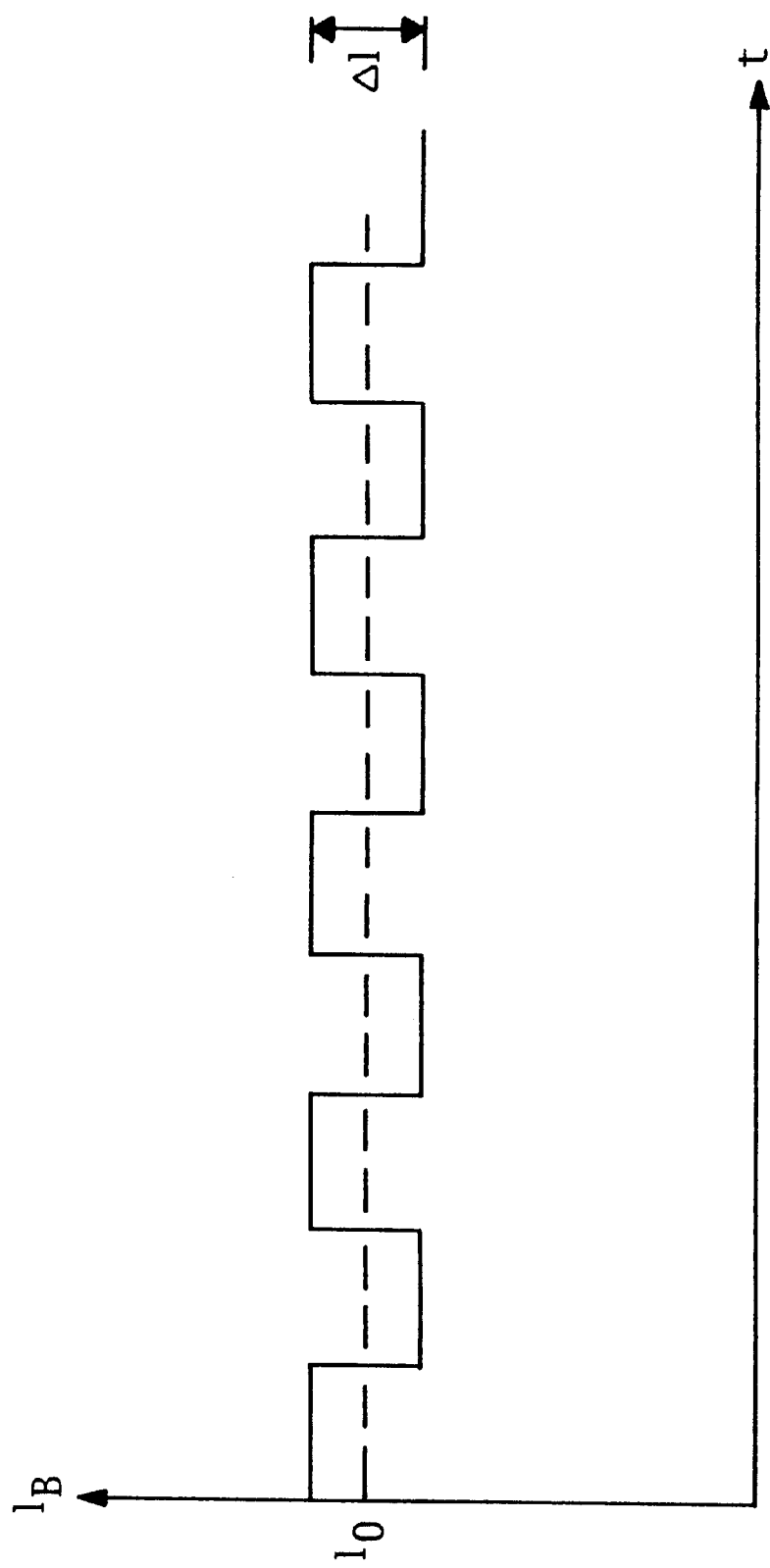
FIG. 5 is an illustration of a modulated bias signal used to bias a read transducer when performing an AE amplifier pole estimation procedure according to the principles of the present invention.

In accordance with one embodiment of the present invention, and with reference to FIGS. 4 and 5, the normally constant bias current, $I_{b0}$, produced by bias current source 114 is modulated with small perturbing signal, $I_b$. The current waveform shown in FIG. 5 depicts a constant bias current having a magnitude of $I_0$, which is modulated using a symmetric square wave, $I_b$. The peak-to-peak variation of the modulated bias current signal is shown as $\Delta I$. It is understood that underlying or perturbing signals other than a symmetric square wave may be employed, although using a square wave significantly simplifies the signal processing effort.

The AE pole estimator 120 performs a number of operations in order to estimate the pole frequency of AE amplifier 116. In one embodiment, AE pole estimator 120 performs discreet Fourier transform (DFT) voltage measurements at the output of AE amplifier 116 for small bias current perturbations at two or more different frequencies, such as frequencies $f_1$ and $f_2$, for example. In a preferred embodiment, the frequency, $f_1$, of a first perturbing signal, $I_{b1}$, is less than the pole frequency of the AE amplifier 116. The frequency, $f_2$, of a second perturbing signal, $I_{b2}$, is generally greater than the pole frequency of the AE amplifier 116. For example, frequencies $f_1$ and $f_2$ may be on the order of two to five times lower and higher, respectively, than the empirically observed pole frequency.

It is noted that for a given AE module design; the frequency within which the low pole frequency is likely to fall may be empirically approximated, in gross terms, by observation of the highpass cutoff characteristics of the AE module frequency response. By way of example, a given AE module implementation may exhibit a highpass filter frequency response with a cutoff frequency of approximately 2 MHz. The frequencies $f_1$ and $f_2$ should be selected so that these frequencies are several times lower and higher, respectively, than the observed pole frequency.

It has been determined that the computations for estimating the AE amplifier low pole frequency is reduced in complexity when the frequency, $f_2$, of the second perturbing signal, $I_{b2}$, is an odd harmonic of the frequency of the first perturbing signal, $I_{b1}$. By way of example, the frequency, $f_2$, of the second perturbing signal, $I_{b2}$, may be a third harmonic, fifth harmonic or seventh harmonic of the frequency, $f_1$, of the first perturbing signal, $I_{b1}$. It is understood that using the first and third harmonics will provide signal-to-noise ratios which are superior to those of odd harmonics of higher order.

It can be appreciated that modulating the read element bias source by use of a square wave automatically generates odd harmonics. Assuming an ideal symmetric and periodic square wave, a given odd harmonic, n, will have an amplitude of $1/n$ of the first harmonic. For example, the amplitude of the third harmonic of an ideal square wave will be $\frac{1}{3}$ of the first harmonic amplitude. The amplitudes of the odd harmonics are thus fixed relative to each other, which advantageously minimizes the sensitivity to changes in amplitude of the two perturbing signals.

AE pole estimator 120 preferably makes DFT voltage measurements while the transducer 110 is flying over an erased track of data storage disk 112. Using the DFT voltage measurements, the AE pole estimator 120 computes the AE pole frequency, pp, which may be derived using the following equation:

$$pp = 2*\pi*f_1 \sqrt{\frac{(\alpha - 1)}{\left(1 - \alpha*\left(\frac{f_1}{f_2}\right)^2\right)}} \quad [4]$$

where, the square impedance and measurement ratio, $\alpha$, is given:

$$\alpha = \left(\frac{V_2 * I_{b1}}{V_1 * I_{b2}}\right)^2 \qquad [5]$$

In Equation [5] above, the term $V_1$ represents the magnitude of the discrete Fourier transform (DFT) component of the output voltage signal, V(n), at the modulation frequency $f_1$, $I_{b1}$ represents the magnitude of the DFT component of a modulating bias current at the modulation frequency $f_1$, $V_2$ represents the magnitude of the discrete Fourier transform (DFT) component of the output voltage signal, V(n), at the modulation frequency $f_2$, and $I_{b2}$ represents the magnitude of the DFT component of a modulating bias current at the modulation frequency $f_2$. As was previously discussed, the frequencies $f_1$ and $f_2$ are preferably selected to be in the vicinity of the AE pole frequency, $f_p = p/(2*\pi)$. The frequencies $f_1$ and $f_2$ are preferably harmonics.

Each of the DFT magnitudes, $V_1$, $V_2$, $I_{b1}$, and $I_{b2}$, may be computed using Goertzel's algorithm. Goertzel's algorithm is an elegant recursive approach to computing the DFT when only one or a few samples of the DFT are required. Use of Goertzel's algorithm is particularly attractive in in-situ applications since it consists almost entirely of real addition and multiplication operations. Only one complex multiplication and one complex addition are required per frequency sample. A description of Goertzel's algorithm may be found in S. K. Mitra, "Digital Signal Processing—A Computer-Based Approach," McGraw Hill (1998, pp. 520–523).

Simulations have demonstrated that optimal results are obtained when the frequencies $f_1$ and $f_2$ are harmonics. For example, if the modulation signal is a square wave of frequency $f_1$, and assuming that $f_2 = 3*f_1$ (i.e., the third harmonic), then the magnitude of the third harmonic, which is $I_{b2}$, is one-third that of the first harmonic, $I_{b1}$ (i.e., $I_{b2} = (\frac{1}{3})I_{b1}$). In this case, the estimation error of the AE pole frequency is less than 0.004% in the frequency range of 1 MHz to 7 MHz. In cases where the frequencies $f_1$ and $f_2$ are first and third harmonics, the AE pole estimation formula characterized in Equation [5] above reduces to:

$$pp = 2*\pi*f_1 \sqrt{\frac{(\alpha - 1)}{\left(1 - \frac{\alpha}{9}\right)}} \qquad [6]$$

where, the square impedance measurement ratio, $\alpha$, is now given by:

$$\alpha = \left(3 * \frac{V_2}{V_1}\right)^2 \qquad [7]$$

Having described circuitry and a methodology for estimating the AE pole frequency, pp, circuitry and a methodology for effectively canceling its effect by pole-zero cancellation using a digital filtering approach will now be described. In accordance with this embodiment of the present invention, once the AE pole frequency, pp, has been determined for a particular read transducer, the zero location of a digital filter may be adjusted to provide precise pole-zero cancellation in the overall AE module transfer function. Using a digital filtering approach of the present invention, the pole, b, of the digital filter may be selectively adjusted depending on the needs of a particular mode of operation. By way of example, the recording channel 124 shown in FIG. 4 may require that the pole be located at $b=2\pi 4e6$ (i.e., 4 MHz). A channel 26 used for analyzing head/slider glide characteristics may require that the pole be located at 20 kHz (i.e., $b=2*\pi 2e4$).

With further reference to FIG. 4, a digital filter 122 is shown coupled to AE pole estimator 120 and the output of sampling switch 118. Digital filter 122 is adjustable in that it has a tunable zero and a fixed pole frequency. The analog equivalent transfer function, H(s), associated with digital filter 122 may be given as:

$$H(s) = \frac{s + pp}{s + b} \qquad [8]$$

where, pp is the estimated AE pole frequency for a specified transducer computed by AE pole estimator 120, which is now assigned as the adjustable zero location for digital filter 122. The pole, b, for the analog equivalent filter characterized in Equation [8] above is fixed.

Cascading the analog equivalent filter characterized in Equation [8] above with the AE amplifier output, and using Equations [1] and [8] above, yields an overall transfer function, GH(s) as is characterized in Equation [9] below. Equation [9] below demonstrates the effect of the pole-zero cancellation procedure.

$$GH(s) = G(s) * H(s) = K_o * K_r * \frac{s}{(s+p)} * \frac{(s+pp)}{(s+b)} \qquad [9]$$

If the estimated AE pole frequency is close to the actual AE pole frequency, i.e., (pp≈p), then Equation [9] above reduces to:

$$GH(s) = K_o * K_r * \frac{s}{(s+b)} \qquad [10]$$

which is independent of the AE pole frequency, p.

The analog equivalent filter transfer function, H(s), characterized in Equation [8] above may be expressed in digital form by the transfer function H(z). The digital transfer function, H(z), can be derived using the matched-z transform with matching occurring at high frequency, as is given by:

$$H(z) = K_d * \frac{(z - zd)}{(z - pd)} \qquad [11]$$

where the components zd, pd, and $K_d$ are respectively given by:

$$zd = e^{\left(\frac{-pp}{f_s}\right)} \qquad [12]$$

$$pd = e^{\left(\frac{-b}{f_s}\right)} \qquad [13]$$

$$K_d = \frac{1 + e^{\left(\frac{-b}{f_s}\right)}}{1 + e^{\left(\frac{-pp}{f_s}\right)}} \qquad [14]$$

If, for a given recording channel, the estimated AE pole was determined to be located at 2.45 MHz and the fixed pole of digital filter 122 was 4.0 MHz, then pp is given by pp=$2\pi 45e6$, and b is given by b=$2\pi 4.0e6$. At a sampling rate, $f_s$, of 63 MHz, the corresponding digital filter would have a transfer function characterized by:

$$H(z) = 0.9371 * \left( \frac{z - 0.7832}{z - 0.6710} \right) \quad [15]$$

The location of an altered zero of digital filter 122 may be computed by the servo processor employing Equations [12] and [14] above. The value of the AE pole location, pp, may be stored for each read transducer and updated at regular intervals. The servo processor may select the pole location, b, via program control for the adjustable digital filter 122.

In summary, the low pole of an AE amplifier may be estimated and compensation may adaptively be provided using the low pole estimation information. In general terms, the AE amplifier pole is estimated by measuring the output of the AE amplifier in response to different input frequencies. The input can be a square wave which provides odd harmonics to the fundamental frequency which simplifies input signal generation and greatly improves the accuracy of the pole frequency estimate. The AE pole is estimated for each head, and its effects are canceled by pole-zero cancellation through the use of an adjustable digital filter. The pole of the digital filter may be selectively altered depending on the particular function to be performed.

Implementing a low pole estimation methodology according to the present invention greatly simplifies equalization of the recording channel by leaving the overall transfer function between the recording head and the input to the recording channel equalizer constant and independent of the MR head characteristics and the dynamic response of the AE amplifier. This results in loosening up of the required component tolerances for both the MR head and the AE module.

It is to be understood that the pole estimation methodology of the present invention may be performed for readback signal amplification systems exhibiting a multiple-pole highpass filter frequency behavior, such as a system exhibiting a frequency response equivalent to a second order highpass filter. In such a case, two perturbing signals, such as two square waves S1 and S2, of differing frequency are employed.

The modulation frequencies, $f_1$ and $f_2$, associated with signal S1 are preferably selected to be several times lower and higher, respectively, than the observed first pole frequency. The modulation frequencies, $f_3$ and $f_4$, associated with signal S2 are preferably selected to be several times lower and higher, respectively, than the observed second pole frequency. The modulation frequencies $f_2$ and $f_4$ are preferably odd harmonics of the modulation frequencies $f_1$ and $f_3$, respectively. The above-described single pole (i.e., low pole) estimation methodology may be performed using each of the perturbing signals, S1 and S2, to determine each of the two pole frequencies.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of estimating a pole frequency of a readback signal amplifier circuit that exhibits a highpass filter frequency behavior, the amplifier circuit coupled to a read transducer, the method comprising:

modulating, while obtaining a readback signal from a data storage medium using the read transducer, a bias signal that biases the read transducer at a first modulation frequency and a second modulation frequency, the readback signal communicated to the amplifier circuit;

measuring an output signal of the amplifier circuit at the first and second modulation frequencies; and determining the frequency of the pole using the output signal measurements.

2. The method of claim 1, wherein the bias signal comprises a current signal or a voltage signal.

3. The method of claim 1, wherein modulating the bias signal comprises:

modulating the bias signal using a first perturbing signal at the first modulation frequency; and modulating the bias signal using a second perturbing signal at the second modulation frequency.

4. The method of claim 3, wherein the first and second perturbing signals comprise substantially symmetric and periodic square waves.

5. The method of claim 1, wherein the second modulation frequency is an odd harmonic of the first modulation frequency.

6. The method of claim 1, wherein the second modulation frequency is a third harmonic of the first modulation frequency.

7. The method of claim 1, wherein the first and second modulation frequencies are odd harmonics of a square wave.

8. The method of claim 1, wherein the first modulation frequency is a frequency less than the frequency of the pole, and the second modulation frequency is a frequency greater than the frequency of the pole.

9. The method of claim 1, wherein:

measuring the output signal comprises digitizing the output signal; and determining the pole frequency comprises determining the pole frequency using the digitized output signal measurements.

10. The method of claim 1, wherein measuring the output signal comprises performing a discrete Fourier transform on the output signal at the first and second frequencies.

11. The method of claim 10, wherein performing the discrete Fourier transform on the output signal comprises performing the discrete Fourier transform on the output signal using Goertzel's algorithm at the first and second frequencies.

12. The method of claim 1, wherein the bias signal comprises a substantially constant current signal, and the output signal comprises a voltage signal.

13. The method of claim 1, wherein determining the pole frequency further comprises:

computing a square impedance measurement ratio using square magnitudes of the bias signal and the output signal respectively measured at the first and second modulation frequencies; and determining the pole frequency further comprises determining the pole frequency using the square impedance measurement ratio and values of the first and second modulation frequencies.

14. The method of claim 1, wherein modulating the bias signal comprises modulating the bias signal at first and second modulation frequencies, $f_1$ and $f_2$, respectively, and the pole frequency, pp, is characterized by the equation:

$$pp = 2*\pi*f_1 \sqrt{\frac{(\alpha-1)}{\left(1-\alpha*\left(\frac{f_1}{f_2}\right)^2\right)}}$$

where, $\alpha$ is characterized by the equation:

$$\alpha = \left(\frac{V_2 * I_{b1}}{V_1 * I_{b2}}\right)^2$$

and where, $V_1$ represents the magnitude of the discrete Fourier transform (DFT) component of an output voltage signal at the modulation frequency $f_1$, $I_{b1}$ represents the magnitude of the DFT component of a modulating bias current at the modulation frequency $f_1$, $V2$ represents the magnitude of the discrete Fourier transform (DFT) component of an output voltage signal at the modulation frequency $f_2$, and $I_{b2}$ represents the magnitude of the DFT component of a modulating bias current at the modulation frequency $f_2$.

15. The method of claim 1, wherein obtaining the readback signal comprises obtaining the readback signal from an erased portion of the data storage medium.

16. The method of claim 1, wherein the pole frequency method is performed for each of a plurality of read transducers.

17. The method of claim 1, further comprising altering the pole frequency.

18. The method of claim 1, wherein the readback signal amplifier circuit exhibits a second order highpass filter frequency behavior, and the method further comprises:
   modulating the bias signal at a third modulation frequency and a fourth modulation frequency;
   measuring an output signal of the amplifier circuit at the third and fourth modulation frequencies;
   determining a frequency of a first pole using the output signal measurements associated with the first and second modulation frequencies; and
   determining a frequency of a second pole using the output signal measurements associated with the third and fourth modulation frequencies.

19. A method of estimating and altering a frequency of a pole of a readback signal amplifier circuit exhibiting a highpass filter frequency behavior, the amplifier circuit coupled to a read transducer, the method comprising:
   estimating the pole frequency of the readback signal amplifier circuit using a modulated bias signal that biases the read transducer and an output signal of the amplifier circuit;
   selecting a mode of operation; and
   altering the pole frequency in response to the selected mode of operation.

20. The method of claim 19, wherein selecting the mode of operation comprises selecting between a recording mode and a diagnostic mode.

21. The method of claim 19, wherein altering the pole frequency comprises altering the pole frequency to a first frequency in response to selecting a first mode of operation, altering the pole frequency to a second frequency in response to selecting a second mode of operation.

22. The method of claim 19, wherein the pole frequency altering method is performed for each of a plurality of read transducers.

23. The method of claim 19, wherein altering the pole frequency comprises filtering the output signal so as to alter the pole frequency to a preestablished frequency.

24. The method of claim 23, wherein filtering the output signal comprises digitally filtering the output signal.

25. The method of claim 19, wherein altering the pole frequency comprises filtering the output signal using a pole-zero cancellation technique.

26. A circuit for estimating a frequency of a pole of a readback signal amplifier that exhibits a highpass filter frequency behavior, the amplifier coupled to a read transducer that obtains a readback signal from a data storage medium, the circuit comprising:
   a modulator coupled to the read transducer, the modulator producing a modulated bias signal at respective first and second modulation frequencies for biasing the read transducer;
   a converter coupled to the amplifier and receiving an output signal representative of the readback signal from the amplifier, the converter converting the output signal to a digitized output signal; and
   a processor that estimates the pole frequency of the readback signal amplifier using a measurement of the digitized output signal at the respective first and second modulation frequencies.

27. The circuit of claim 26, wherein the second modulation frequency is an odd harmonic of the first modulation frequency.

28. The circuit of claim 26, wherein the modulator uses a substantially symmetric and periodic square wave signal to modulate the bias signal.

29. The circuit of claim 26, wherein the first modulation frequency is a frequency lower than the pole frequency and the second modulation frequency is a frequency higher than the pole frequency.

30. The circuit of claim 26, wherein the read transducer comprises a magnetoresistive element.

31. The circuit of claim 26, wherein the processor performs a discrete Fourier transform on the digitized output signal to obtain the respective measurements of the digitized output signal at the first and second modulation frequencies.

32. The circuit of claim 31, wherein the processor performs the discrete Fourier transforms using Goertzel's algorithm.

33. The circuit of claim 26, wherein the processor computes a square impedance measurement ratio using square magnitudes of the bias signal and the digitized output signal respectively measured at the first and second modulation frequencies, and estimates the pole frequency using the square impedance measurement ratio and values of the first and second modulation frequencies.

34. The circuit of claim 26, further comprising a digital filter coupled to the converter and the processor, the digital filter altering the pole frequency in response to a mode selection signal received from the processor.

35. The circuit of claim 26, further comprising a digital filter coupled to the converter and the processor, the digital filter altering the pole frequency using a pole-zero cancellation technique.

36. The circuit of claim 26, wherein the bias signal comprises a substantially constant current signal, and the output signal comprises a voltage signal.

37. A data storing system, comprising:
   a data storage disk;
   a plurality of transducers each supported by a support structure in proximity with the disk;
   an actuator that provides relative movement between the transducers and the disk;
   an amplifier coupled to the transducers;

a modulator coupled to the transducers, the modulator producing a modulated bias signal at respective first and second modulation frequencies for biasing the read transducers;

a converter coupled to the amplifier and receiving an output signal representative of the readback signal from the amplifier, the converter converting the output signal to a digitized output signal; and a processor that selectively couples each of the transducers to the amplifier and estimates a pole frequency of the readback signal amplifier associated with each of the respective transducers using a measurement of the digitized output signal at the respective first and second modulation frequencies.

38. The system of claim 37, wherein the second modulation frequency is an odd harmonic of the first modulation frequency.

39. The system of claim 37, wherein the modulator uses a substantially symmetric and periodic square wave signal to modulate the bias signal.

40. The system of claim 37, wherein the first modulation frequency is a frequency lower than the pole frequency and the second modulation frequency is a frequency higher than the pole frequency.

41. The system of claim 37, wherein at least some of the transducers comprise a magnetoresistive element.

42. The system of claim 37, wherein the processor performs a discrete Fourier transform on the digitized output signal to obtain the respective measurements of the digitized output signal at the first and second modulation frequencies.

43. The system of claim 37, wherein the processor computes a square impedance measurement ratio using square magnitudes of the bias signal and the digitized output signal respectively measured at the first and second modulation frequencies, and estimates the pole frequency using the square impedance measurement ratio and values of the first and second modulation frequencies.

44. The system of claim 37, further comprising a digital filter coupled to the converter and the processor, the digital filter altering the pole frequency in response to a mode selection signal received from the processor.

45. The system of claim 37, wherein the bias signal comprises a substantially constant current signal, and the output signal comprises a voltage signal.

* * * * *